United States Patent [19]

Trimble et al.

[11] 4,090,478

[45] May 23, 1978

[54] MULTIPLE CYLINDER SINUSOIDAL ENGINE

[76] Inventors: James A. Trimble, 7352 58th Ave. NE., Seattle, Wash. 98115; Ervin L. Crosby, 23917 114th Pl. W., Edmonds, Wash. 98020

[21] Appl. No.: 708,375

[22] Filed: Jul. 26, 1976

[51] Int. Cl.$^2$ ....................... F02B 75/26; F01B 13/06; F16H 33/00

[52] U.S. Cl. .................................... 123/58 R; 74/57; 92/12.2; 92/33; 92/71; 91/411 R; 123/51 R; 123/58 A; 123/58 B

[58] Field of Search ............. 123/58 R, 58 A, 58 AA, 123/58 AB, 58 AM, 58 B, 58 BB, 58 BA, 58 BC, 58 C, 51 AA, 51 R, 51 A, 51 B; 92/31, 71, 12.2, 33; 74/57; 91/205, 411 R, 197, 175

[56] References Cited

U.S. PATENT DOCUMENTS

| | | | |
|---|---|---|---|
| 1,520,960 | 12/1924 | Nagelmann | 123/58 BA |
| 2,647,363 | 8/1953 | Stott | 123/58 AA |
| 3,456,630 | 7/1969 | Karlan | 123/58 AM |

FOREIGN PATENT DOCUMENTS

| | | | |
|---|---|---|---|
| 1,188,915 | 3/1959 | France | 123/58 R |
| 647,815 | 8/1928 | France | 123/58 AA |
| 782,997 | 3/1935 | France | 123/58 A |
| 264,893 | 1/1927 | United Kingdom | 123/58 AM |

*Primary Examiner*—Wendell E. Burns

*Attorney, Agent, or Firm*—Christensen, O'Connor, Johnson & Kindness

[57] ABSTRACT

A multiple cylinder sinusoidal engine comprising a plurality of piston/cylinder arrangements lying parallel to, and around, a shaft cylinder is disclosed. Mounted in the shaft cylinder is a sine shaft, i.e., a cylindrical shaft having formed in its periphery at least one closed, double wave, continuous, sinusoidal groove. Coupling mechanisms couple the pistons to the sinusoidal groove or grooves of the sine shaft such that reciprocating motion of the pistons causes rotary motion of the shaft. Various air/fuel, exhaust and ignition passageways are provided through the sine shaft (or through the engine block in some embodiments) to allow air and fuel to enter the piston cylinders and exhaust gases to be emitted therefrom, and to allow ignition energy to be applied to air/fuel mixtures, as necessary. In one form, a single igniter is provided. The single igniter is coupled, sequentially, to each piston/cylinder arrangement as the sine shaft revolves. Alternatively, an igniter is provided for each piston/cylinder arrangement. Further, the sine shaft functions as a rotary valve that directs an air/fuel mixture or air and/or fuel, as the case may be, into each piston/cylinder combustion chamber, and directs exhaust gases therefrom to an exhaust passageway, all in a normal engine cycle sequence, such as a four-cycle sequence.

28 Claims, 11 Drawing Figures

MULTIPLE CYLINDER SINUSOIDAL ENGINE

BACKGROUND OF THE INVENTION

This invention is directed to mechanisms for translating reciprocating power into rotary power and, more particularly, to engines, such as internal combustion engines, for translating reciprocating piston motion into rotary shaft motion.

Various types of mechanical power generating devices have been proposed and are in use. The most common device for producing horsepower in lower ranges, e.g., below several hundred horsepower, is the internal combustion engine. Broadly, internal combustion engines include two-cycle and four-cycle gas engines, and diesel engines. While various of these types of internal combustion engines have found widespread use, in the past they have all had a number of disadvantages.

One disadvantage of most prior art internal combustion engines in widespread use in vibration. Vibration, which is most pronounced during starting and transmission gear shifting is a result of the unbalanced design of most internal commbustion engines. More specifically, most internal combustion engines comprise a single cylinder, or a plurality of cylinders mounted along axes that lie orthogonal to the longitudinal (rotational) axis of a crankshaft. As the pistons reciprocate back and forth in a piston cylinder, the crankshaft (or some equivalent structure) is rotated. While a well-tuned multiple cylinder engine, if well balanced, appears to produce only a small amount of vibration, because of imperfect balancing, some vibration is always produced. As a result, such engines are often supported on vibration absorbing engine mounts. While this arrangement eliminates the effects of vibration (for example, in the interior of an automobile) it does not eliminate the vibration.

One of the primary reasons that prior art internal combustion engines and the like produce vibration relates to their manner of construction. Generally, the driving pistons are not equally spaced about the shaft to be rotated, rather they are located along axes that project orthogonally outwardly from the rotational axis at spaced points, the axes defining either a single radial plane (straight or in-line engine) or two radial planes (V8 engine). Thus, generally power is only applied to the crankshaft from one side, as opposed to being applied equally from all sides of the crankshaft. This arrangement of necessity creates some vibration. Depending upon crankshaft balance and a number of other factors, the amount of vibration can be substantial. Further, engine balancing to reduce vibration adds weight without any power benefit and, thus, is an undesirable approach to solving engine vibration problems.

Another disadvantage of prior art internal combustion engines and the like, relates to their complexity. Specifically, internal combustion engines, particularly those of a four-cycle variety, require relatively complex valving arrangements to control the drawing of a suitable air/fuel mixture into each combustion chamber just prior to each compression stroke and the exhaustion of exhaust gases. The valving arrangements are complex because each cycle function must occur in the right sequence with respect to each piston/cylinder arrangement and each piston/cylinder sequence must be correctly "timed" with every other such sequence. The result of these "timing" requirements are complex arrangements of cams, valves, push rods, rocker arms, gears, etc. and, thus, complex engines that are expensive to manufacture, assemble and maintain. Much of this expense and complexity is a direct result of the rod/crankshaft reciprocating-to-rotary motion coupling mechanism. This same disadvantage holds true for many other reciprocating-to-rotary motion coupling mechanisms, i.e., mechanisms of this type used in other environments.

Various attempts have been made to overcome the foregoing disadvantages of internal combustion engines. However, these attempts have been generally unsatisfactory. In many cases, they are mere variations on standard internal combustion engines. Alternatively, the proposed engines have been even more complicated than standard engines. Still further many have been unreliable due to "weak" links in their reciprocating-to-rotary motion coupling mechanisms. Thus, for various reasons, standard internal combustion engines have been the "mainstay" of relatively low power generating systems, i.e., those below several hundred horsepower.

Therefore, it is an object of this invention to provide a new and improved engine.

It is another object of this invention to provide a new and improved multicylinder engine.

It is a further object of this invention to provide a new and improved apparatus for translating reciprocating motion into rotary motion.

It is another object of this invention to provide a new and improved multicylinder internal combustion engine.

It is yet another object of this invention to provide a new and improved multicylinder internal combustion engine that is less complex and, therefore, more inexpensive to produce than prior art internal combustion engines having an equal number of cylinders.

SUMMARY OF THE INVENTION

In accordance with principles of this invention, a new and improved multicylinder engine is provided. The engine block defines a plurality of cylinders having their longitudinal axes lying parallel to one another and parallel to and about the longitudinal axis of a shaft cylinder. Mounted in the shaft cylinder is a sine shaft. Located about the periphery of the sine shaft is one or more sinusoidal tracks. Mounted in each of the cylinders is a piston coupled to the sine track or tracks by a coupling mechanism. As the pistons are caused to reciprocate back and forth, the coupling mechanisms follow the sinusoidal tracks and cause the sine shaft to rotate. Thus, reciprocal motion is translated into rotary motion. Preferably, the sinusoidal tracks are in the form of sinusoidal grooves.

In accordance with further principles of this invention, in an internal combustion engine embodiment, a suitable air/fuel mixture is sequentially injected (or drawn) into each piston/cylinder combustion chamber. Then, an ignition device sequentially ignites the air/fuel mixtures to cause reciprocating motion of the pistons and, shaft rotation.

In accordance with further principles of this invention, in the preferred form of a four-cycle internal combustion embodiment of the invention, each sinusoidal groove comprises a double wave, i.e., two complete sinusoidal waves. Thus, all four combustion cycles (intake-compression-power-exhaust) occur once during each revolution of the shaft. Further, preferably in all forms, the sine shaft includes air/fuel intake and exhaust gas exhaust passageways and a rotary valve arrangement for coupling the passageways to the combustion chambers of the piston/cylinder arrangements.

In one form, air flows through a first passageway formed in the sine shaft and is sequentially drawn into the combustion chamber of each cylinder via an intake rotary valve as the shaft rotates. In addition, fuel is directed via second passageway in the sine shaft into the intake rotary valve. Ignition is provided by a single igniter mounted adjacent to the periphery of the sine shaft in a position such that it sequentially, at or near the end of the compression stroke, ignites the air/fuel mixtures in the combustion chambers. Exhaust gases are exhausted via an exhaust rotary valve and an exhaust passageway also formed in the sine shaft.

In an alternate form, only air is drawn into the combustion chambers of the piston cylinders via an intake rotary valve as the shaft rotates, and fuel is injected by fuel injectors located in the engine block, one injector for each combustion chamber. The fuel may be ignited by either a single igniter mounted adjacent to the outer periphery of the sine shaft, or by separate igniters also located in the engine block. Still further, if desired, an entire air/fuel mixture (mixed by a carburetor, for example) can be drawn into the combustion chambers via the intake rotary valve during an intake stroke. In any case, preferably, the intake and exhaust rotary valves are formed by ports located at appropriate locations in the outer periphery of the sine shaft. When these ports are aligned with suitable combustion chamber ports either air or air/fuel intake, or exhaust gas exit occurs.

In its present most preferred form, the sine shaft of a four-cycle engine embodiment of the invention includes two sets of sinusoidal grooves, each of which comprises a double wave and each cylinder houses a pair of opposing pistons. One piston is coupled to the first pair of sine grooves and the other piston is coupled to the other pair of sine grooves. The pistons reciprocate toward and away from one another. While this is the preferred form of this type of embodiment of the invention and is hereinafter described, obviously, other forms can be utilized, as desired.

It will be appreciated from the foregoing summary that the invention comprises a new and improved engine that overcomes many of the disadvantages of prior art engines discussed above. The engine is basically a balanced arrangement, since the piston/cylinder arrangements surround the shaft and can be placed at equal spaced radial locations. Moreover, the valving and power coupling arrangements of prior art engines are reduced in complexity, or entirely eliminated. Since air, or an air/fuel mixture, is drawn into the combustion chambers via the sine shaft, an uncomplicated rotary valve arrangement is used, as opposed to a complicated cam controlled multiple valve arrangement. The exhausting of exhaust gases via the sine shaft allows a similar simple rotary exhaust valve arrangement to be used, and a similar advantageous result to be achieved, i.e., the elimination of a multiple cam/valve arrangement. Because complexity is reduced, ease of assembly and disassembly is provided. Further, by splitting the overall housing or engine block into two sections along a plane orthogonal to the longitudinal axis of the sine shaft, the entire structure to be readily assembled and disassembled. Thus, the invention overcomes the previously discussed disadvantages of prior art engines, particularly engines of a multiple cylinder internal combustion nature.

While the engine of the invention is best suited for implementation as a multiple cylinder four-cycle, internal combustion engine, it can also be implemented in other manners. For example, it can be implemented as a two-cycle internal combustion engine. In addition, it an be driven by power sources other than hydrocarbon power sources. For example, it can be driven by steam, if desired.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 5:
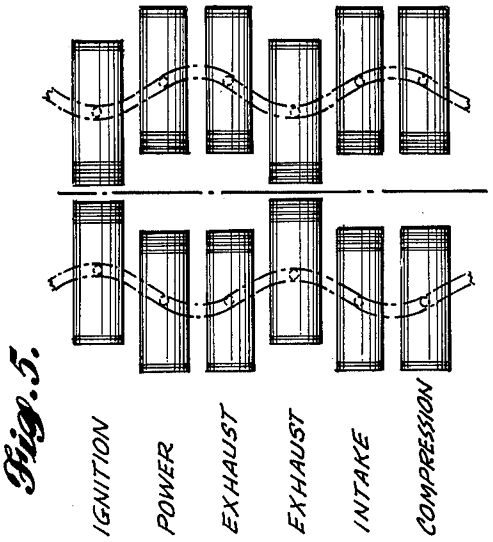
FIG. 5 is a pictorial schematic view illustrating piston positions for the embodiment of the invention illustrated in FIG. 1 with respect to a particular position of a double wave sinusoidal groove, and is used to describe the operation of the invention.

Turning now to the drawings, FIGS. 1-9 illustrate a preferred embodiment of the invention. The embodiment of the invention illustrated in these figures is a four-cycle multiple cylinder sinusoidal groove internal combustion engine. While this structural arrangement is preferred, it will be appreciated by those skilled in the art and others, as the description progresses, that the same general structural arrangement, with minor modifications, can be used to form a two-cycle internal combustion engine. Alternatively, power sources other than a combustible air/hydrocarbon fuel mixture can be used, with further modifications, if desired. For example, a steam driving medium can be utilized as the power source, if desired.

As best illustrated in FIGS. 1-4, a multiple cylinder sinusoidal engine formed in accordance with the invention comprises an engine block 21 formed of two barrel sections 23 and 25, which are substantially mirror images of one another. The barrel sections 23 and 25 are mounted along a principle longitudinal axis 27 so as to face one another. Mounted coaxially about the principle longitudinal axis 27, on either side of the block 21 are thrust bearing housings 29 and 31. Mounted coaxially about the longitudinal axis 27 on the other side of one of the thrust bearing housings 29 is a fuel and ignition coupler 33. Mounted coaxially along the longitudinal axis 27 on the other side of the other thrust bearing housing is an exhaust and air intake coupler 35.

Figure 2:
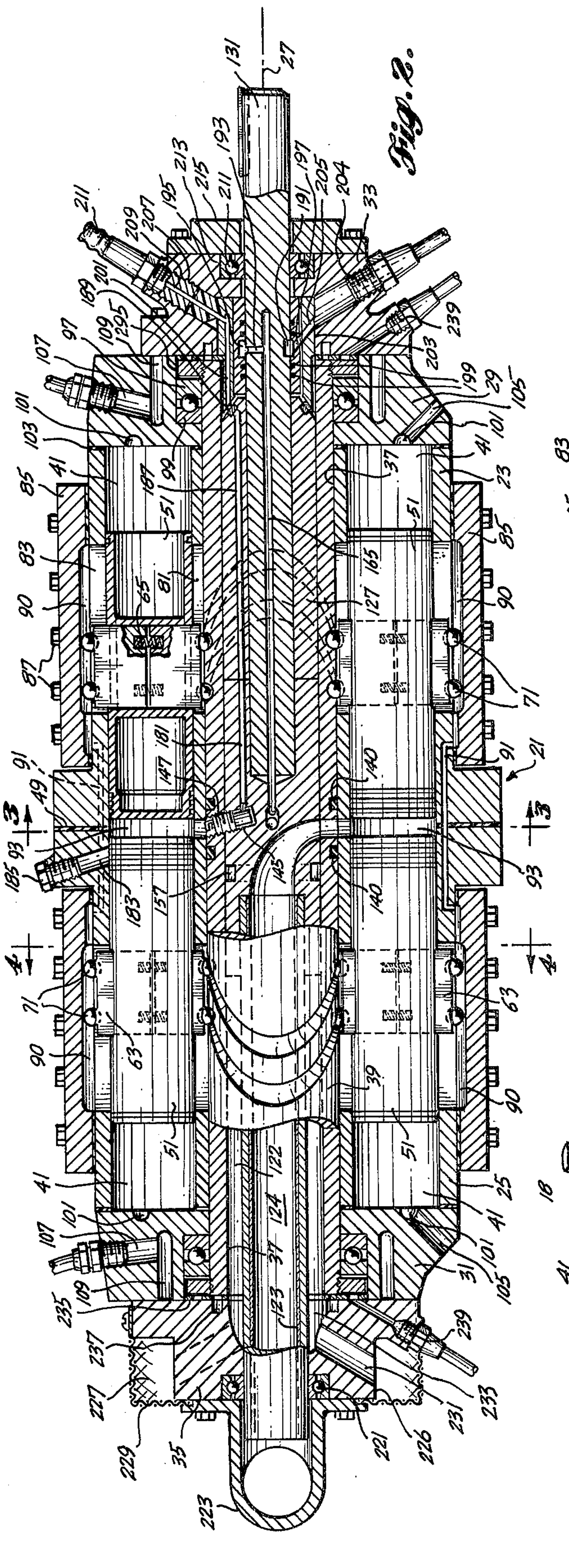
FIG. 2 is a longitudinal cross-sectional view of the engine illustrated in FIG. 1.
Figure 4:
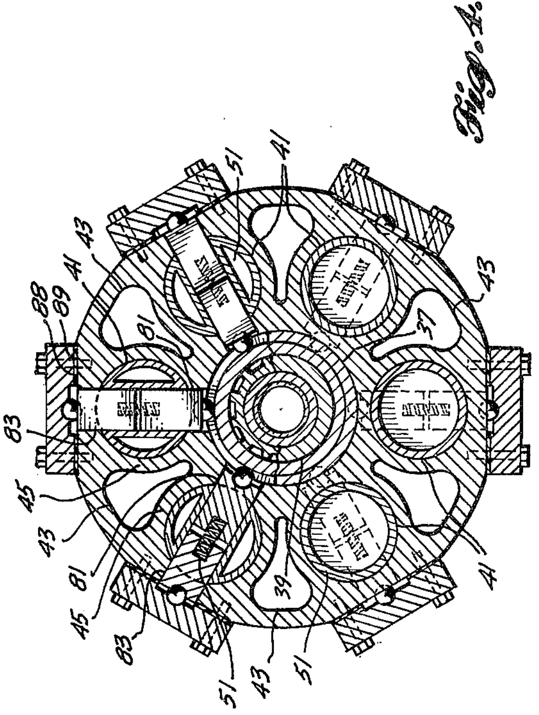
FIG. 4 is a cross-sectional view along line 4—4 of FIG. 2.
Figure 3:
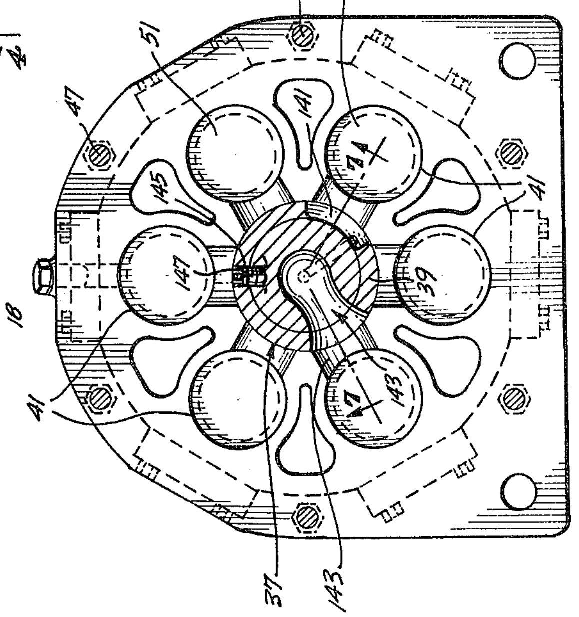
FIG. 3 is a cross-sectional view along line 3—3 of FIG. 2.

As best illustrated in FIGS. 2-4, each of the barrel sections 23 and 25 includes a cylindrical aperture 37. The cylindrical central apertures 37 of the barrel sections 23 and 25 are aligned with one another and have their longitudinal axes lying coaxial with the principle longitudinal axis 27. As will be better understood from the following description, the principle longitudinal axis 27 is the axis of rotation.

Mounted in the cylindrical central apertures 37 is a sine shaft 39 whose nature and operation is hereinafter described. Surrounding each cylindrical central aperture 37 of each barrel section are six cylinders 41. Related cylinders of the sections are aligned with one another and the longitudinal axes of the cylinders 41 lie parallel to the principle longitudinal axis 27. The six cylinders are located along equally-spaced radii, ie., radii spaced by 60°, with respect to the principle longitudinal axis 27. Formed in the barrel sections 23 and 25, between each adjacent pair of cylinders 41, are water passageways 43. The water passageways, of course, are separated from their related cylinders 41 by metal cylinder walls 45, as in a conventional engine. Thus, water flowing in the water passageways receives heat generated by the movement of pistons in the cylinders 41 via the cylinder walls 45.

Figure 1:
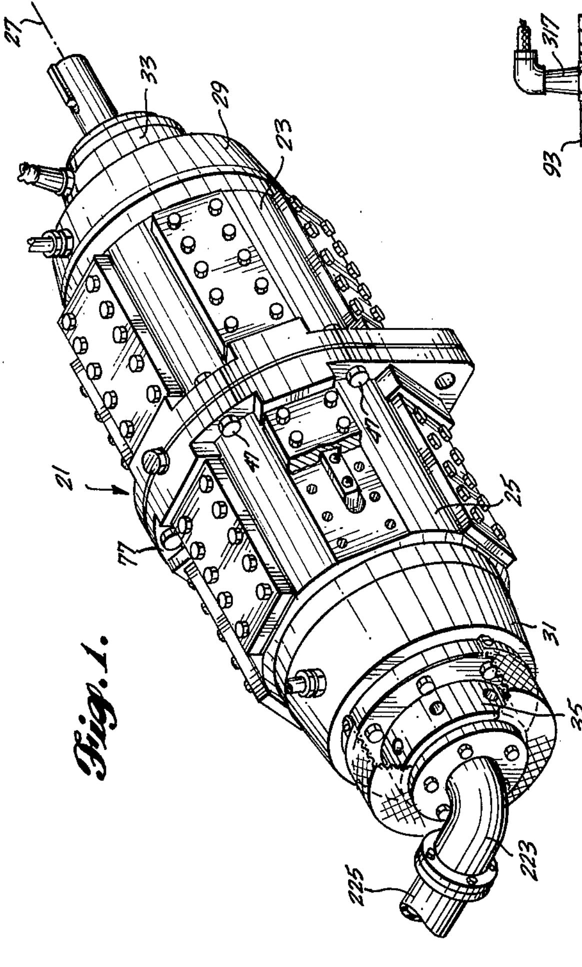
FIG. 1 is a pictorial view of a preferred embodiment of a multicylinder sinusoidal engine formed in accordance with the invention.

It will be appreciated from the foregoing discussion that, each barrel section includes a cylindrical central aperture 37 and surrounded by a plurality of spaced, parallel cylinders 41. In addition, water passageways 43 for allowing cooling liquid (e.g. water or a water-coolant mixture) water to flow through the engine barrel sections is provided. As previously noted, the engine barrel sections are aligned in a mirror image manner such that the cylinders, as well as the cylindrical central apertures 37 are aligned. As illustrated in FIG. 1, bolts 47 are used to connect the two barrel sections together. Preferably an apertured gasket 49 (FIG. 2) is located between the mating faces of the barrel sections. The gasket apertures, of course, are formed similar to and are aligned with the various apertures in the barrel sections, i.e., the cylindrical central aperture 37, the cylinder apertures 41 and the flow passageway apertures 43.

Figure 7:
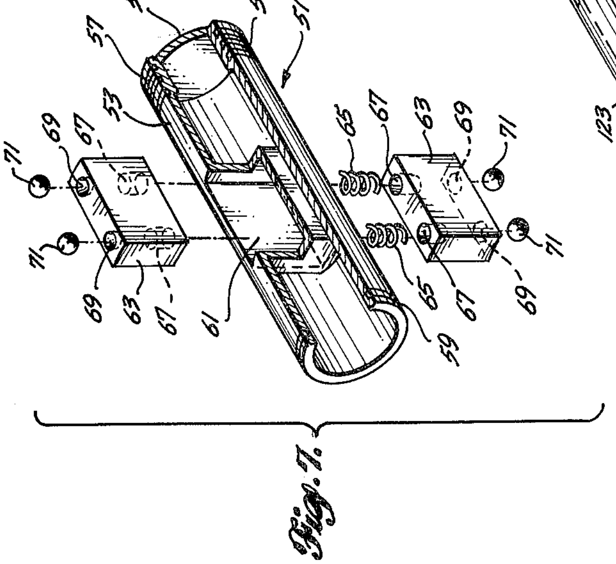
FIG. 7 is an exploded perspective view of a piston and a coupling mechanism for coupling the piston to the sinusoidal grooves of a sine shaft of the type illustrated in FIG. 6.

Mounted in each cylinder 41 is a piston assembly 51. As best illustrated in FIG. 7, each piston assembly 51 includes a cylindrical piston 53 and a coupling mechanism 54. One end of each cylindrical piston 53, herein defined as the head 55, is enclosed. Surrounding the cylindrical periphery of the pistons 53 near the heads are a plurality of conventional piston rings 57. While three pistons rings 57 are illustrated, a greater or lesser number can be utilized, as determined by the nature of a specific engine.

The end of each cylindrical piston 53 remote from its head is open and is herein defined as the tail. Surrounding the cylindrical periphery of each piston near its tail end is a single piston ring 59. Located intermediate the head and tail of each piston 53 is a rectangular aperture 61. The rectangular apertures pass through the cylindrical axis of the cylindrical pistons 53, with the longer walls of the rectangular apertures 61 lying parallel to the cylindrical axis of the cylindrical piston 53, on either side thereof. Thus, the short walls lie orthogonal to the cylindrical axis.

A pair of rectangular blocks 63 are slidably mounted in each rectangular aperture 61. The rectangular blocks are slidably movable in a direction orthogonal to the cylindrical axes of the pistons 53. Two coil springs 65 extend between each pair of rectangular blocks 64 and are maintained laterally immovable by being mounted in aligned apertures 67. The coil springs 65 create force that pushes the blocks 63 away from one another and outwardly with respect to the longitudinal axes of the pistons 53. Located in the outer edge of each rectangular block 63 are a pair of semi-circular apertures 69. The semi-circular apertures form races for ball bearings 71.

The rectangular blocks 63, coil springs 65 and ball bearings 71 are sized such that when the blocks are entirely compressed against one another, the outer edges of the blocks still extend slightly beyond the cylindrical outer periphery (walls) of the pistons 53. Thus, the ball bearings also extend beyond the piston walls.

As seen in FIGS. 2 and 4, formed in the engine barrel section 23 and 25 are a series of inner slots 81 and a series of outer slots 83. An inner slot 81 is located in each barrel section between each cylinder 41 and the cylindrical central aperture 37. An outer slot 83 extends between each cylinder 41 and the outer periphery of the related barrel section 23 or 25. The longitudinal axes of the slots lie parallel to the longitudinal axes of their related cylinders and the set of inner and outer slots 81 and 83 related to each cylinder form a pair of slots that lie along a radius extending outwardly from the principle longitudnal axis 27. The pairs of radial slots 81 and 83 are also formed such that the portions of the rectangular blocks 63 projecting through the cylindrical peripheries of the pistons 53 will lie in the radial slots 81 and 83 when the pistons are mounted in the cylinders 41. The longitudinal length of the slots is such that the related pistons 51 can move back and forth without the piston rings reaching the ends of the slots.

Each of the outer slots 83 is enclosed by a ball carriage cover 85. Bolts 87 affix the ball carriage covers 85 to flat regions 89 of the outer surface of the barrel sections. The flat regions surround the outer slots 83. Preferably gaskets 88 are located between the ball carriage covers and the flat regions 89. Located in the ball carriage covers 85 in line with the balls associated with the outer rectangular block 63 is an elongated outer race groove 90. A lubrication passageway 91 formed partially in each engine barrel section 23 and 25 connects longitudinally aligned outer race grooves 89 together. The lubrication passageway 91 allows lubricant to flow between aligned outer race grooves.

When the pistons 51 are mounted in their related cylinders, they are aligned such that the heads 55 of related pairs point toward one another. As will be better understood from the following description, a combustion chamber 93 is formed between the aligned piston heads.

As previously discussed, coaxially aligned thrust bearing housings 29 and 31 are mounted on either side of the engine barrel sections 23 and 25. The thrust bearing housings are similarly formed and are generally cylindrical in shape. The thrust bearing housings are sized such that they enclose the ends of their related cylinders 41. In addition, the thrust bearing housings include a central aperture through which the hereinafter described sine shaft 39 passes. The central apertures each include an undercut region 97 within which a thrust bearing 99 is mounted. The thrust bearings comprise ball bearing structures including one race adapted to be pressed into the undercut region, or keyed, splined or in some other manner affixed thereto. The other race is adapted to be press fit to the sine shaft 39 as hereinafter described, or keyed, splined or in some other manner affixed thereto.

An inner annular groove 101 is formed in the faces of the thrust bearing housings 29 and 31 lying adjacent to the barrel sections 23 and 25. The inner annular grooves circumscribe the ends of the cylinders 41 and, thus, are in communication therewith. A gasket 103 mounted between the thrust bearing housings 29 and 31, and their related barrel section prevents communication between the inner annular goove 101 and the ends of the water passageways running between the cylinders. The inner annular grooves are connected to one or more outwardly projecting passageways 105.

The inner annular grooves in combination with their related outwardly projecting passageways provide relief ports for the outer chambers formed between the cylinders 41 and the tails of the pistons 51. In the absence of such a relief port, movement of the pistons back and forth in the manner hereinafter-described would result in reduced power due to the compression and expansion of air in the outer chambers. The relief ports allow air to freely leave and enter these chambers and, thus, alleviate this problem.

Communication with the water passageway 43 is also provided via the thrust bearings housings 29 and 31. One of the thrust bearing housing provides an inlet passageway and the other provides an outlet passageway. Both thrust bearing housings include an inwardly projecting passageway 107 connected to an annular outer groove 109. The annular outer grooves 109 act as a manifold and are connected to apertures (not shown) that project inwardly from the annular outer grooves 109 to the cooling water passageways 43, through the gaskets 103. In summary, water enters via one inwardly projecting passageway 107, flows through its related outer annular groove 109, enters the water passageways 43 via the apertures, exits the water passageways via the other apertures and annular outer groove 109 and leaves the engine via the other inwardly projecting passageway 107.

Figure 6:
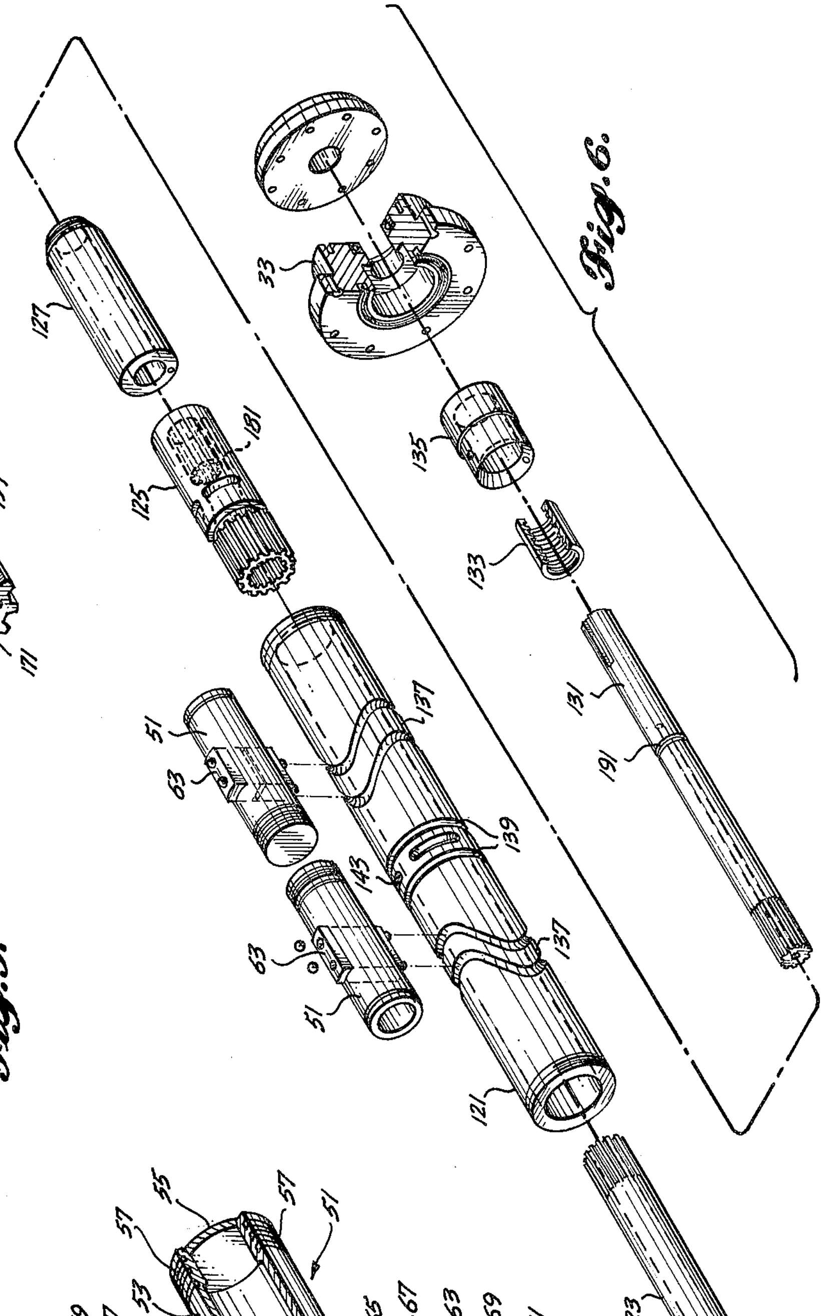
FIG. 6 is an exploded pictorial view of a sine shaft suitable for use in the embodiment of the invention illustrated in FIG. 1, plus certain selected related components including a pair of associated pistons and their related coupling mechanism.

The sine shaft 39 is best illustrated in FIG. 6 and comprises: a sine sleeve 121; an exhaust tube 123; a rotary valve coupler 125; an ignition sleeve 127; a drive shaft 131; a rotary fuel coupler 133; and, an ignition coupler 135.

The sine sleeve 121 is a cylindrical sleeve having a diameter slightly less than the diameter of the cylindrical central aperture 37. Formed in the outer surface of the sine sleeve 121 are two pairs of sinusoidal grooves 137. Each pair includes two sinusoidal grooves following identical paths, but spaced from one another by a distance equal to the distance between the two balls mounted in the outer semicircular apertures 69 in the rectangular blocks 63 of the piston coupling mechanism previously described. The pairs of sinusoidal grooves are also formed such that each pair covers a double wave and such that the two pairs are 180° out of phase. Thus, sinusoidal groove apexes, as better illustrated in FIG. 5, are alternately closely and remotely spaced.

Formed in the sine sleeve 121, between the pairs of sinusoidal grooves 137, and spaced from one another, are two circumferential grooves 139. The circumferential grooves are located on opposing sides of an inlet port 141 and an outlet port 143. As will be better understood from the following description, the inlet port is adapted to allow air or fuel and air to enter the combustion chambers 93, formed between pairs of related pistons 51, and the outlet port is adapted to allow exhaust gases to escape from the combustion chambers. The circumferential grooves 139 house seals 140 adapted to prevent the exhaust gases or the incoming air or air/fuel mixtures from flowing through the small space existing between the sine sleeve 121 and the cylindrical central aperture 37. An ignitor aperture 145 not viewable in FIG. 6, but viewable in FIGS. 2 and 3, is provided to house an igniter 147 (e.g., spark plug) coupled to an electrical source via the sine shaft in the manner hereinafter described.

The sine sleeve 121 is mounted in the thrust bearings 97 housed in the thrust bearing housings 29 and 31. The mounting is such that the pairs of sinusoidal grooves 137 receive the ball bearings 71 mounted in the semicircular apertures 69 in the inner blocks 63. Thus, these ball bearings ride in the sinusoidal grooves. The coupling is such that, as the pistons 151 are reciprocated back and forth in the manner hereinafter described, the ball bearings, following the sinusoidal grooves, cause the sine sleeve 121 to rotate. In this manner a reciprocating-to-rotary coupling mechanism is provided without requiring the inclusion of crank shafts, connecting rods, etc.

The rotary valve coupler 125 is generally cylindrical and has an outer diameter equal to the inner diameter of the sine sleeve 121. The rotary valve coupler is aligned with and slid into the sine sleeve 121. The alignment is such that an air/fuel port 151 formed in the rotary valve coupler as hereinafter described is aligned with the inlet port 141 of the sine sleeve and an exhaust port 153 is aligned with the outlet port 143 of the sine sleeve.

Figure 8:
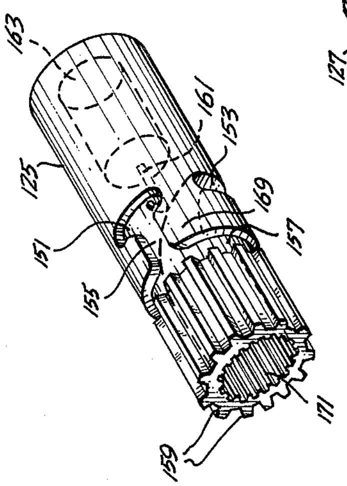
FIG. 8 is a perspective detailed view of a cylindrical rotary valve manifold, forming part of the sine shaft, for controlling the sequential flow of intake and exhaust gases into and out the combustion chambers.
Figure 9:
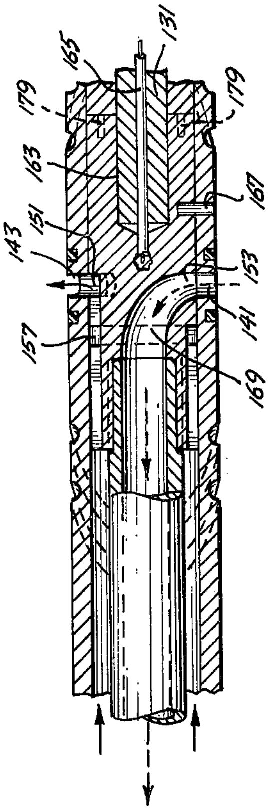
FIG. 9 is a cross-sectional view illustrating in more detail exhaust and intake passageways formed in the sine shaft illustrated in FIG. 6.

The air/fuel port 151, as illustrated in FIG. 8 is an undercut region formed in the outer cylindrical surface of the rotary valve coupler 125, that is generally oval in planar shape. A slot 155 extends between the air/fuel port 151 and an annular groove 157 spaced therefrom, and on one side thereof. Extending from the annular groove 157 toward the nearest end of the rotary valve coupler 125 are a plurality of parallel slots 159. The parallel slots 159 are orthogonal to the annular groove 157, i.e., they lie along axes that are parallel to the longitudinal axis of the rotary valve coupler 125. As will be better understood from the following discussion, the parallel slots 159, annular groove 157, slot 155 and air/fuel port 151, plus the surrounding wall of the sine sleeve, provide an air intake passageway through the rotary valve coupler.

In the illustrated structure, fuel is injected or drawn into the air/fuel port 151 via a fuel passageway 161 that terminates at the air/fuel port 151. The fuel passageway is L-shaped and passes through the rotary valve coupler, so as to extend from the air/fuel port 151 toward the end of said rotary valve coupler remote from the slotted end. The passageway 151 terminates at the inner end of a coaxial cylindrical aperture 163 formed in that end of the rotary valve coupler. The coaxial cylinder aperture 163, as best seen in FIG. 7, receives the inner end of the drive shaft 131. The shaft 131 includes a coaxial central aperture 165 aligned with the fuel passageway 161 for transporting fuel to the fuel passageway and, thence, to the air/fuel port of the rotary valve coupler 125. The drive shaft is pressed into or keyed or spline connected, to the rotary valve coupler 125.

The exhaust port 153 of the rotary valve coupler 125 is the terminating end of an exhaust passageway 169 that flairs toward the end of the rotary valve coupler 125 remote from the end receiving the drive shaft 131. The exhaust passageway 169 terminates at the inner end of a splined coaxial aperture 171. The splined coaxial aperture receives a splined end of the exhaust tube 123. The outer diameter of the exhaust tube is substantially smaller than the inner diameter of the sine sleeve 121 thereby an outside passageway 122 lies between the exhaust tube and since sleeve and an inside passageway 124 exists inside the exhaust tube. The outside passageway 122 is in communication with the parallel slots 159 formed in the outer surface of the rotary valve coupler 125 and provides a conduit for directing air to those slots. The inside passageway 124 is obviously in communication with the exhaust passageway and thus, provides a conduit for directing exhaust gases out of that passageway.

As best illustrated in FIG. 3, when viewed in cross section, the air/fuel port 151 and related inlet port 141, the exhaust port 153 and related outlet aperture 143 and the ignition aperture 145 are all separated by 120°. More precisely, the angles between radial lines bisecting these ports and igniter aperture are all 120°. Thus, when one port (e.g. air/fuel-inlet) is aligned with the combustion chamber of a first set of pistons 51 and the other port (e.g. exhaust) is aligned with the combustion chamber of a second set of pistons, one set of pistons lies between these two sets of pistons. At the same time, the igniter aperture 145 is aligned with the combustion chamber of a third set of pistons spaced from the first and second sets of pistons by the other two sets. Obviously, if the number of multiple pairs of cylinders is greater to, or lesser than, six, these angular relationships will change. And, depending upon construction, they may become unequal.

The ignition sleeve 127 includes an inner longitudinal aperture substantially equal in diameter to the outer diameter of the drive shaft 131. The ignition sleeve 127 is mounted about the drive shaft adjacent to the rotary valve coupler 125. The outer diameter of the ignition sleeve 127 is substantially equal in size to the outer diameter of the rotary valve coupler 125 and, thus, the inner diameter of the sine sleeve 121. Coupling pins 179 couple the ignition sleeve 127 to the rotary valve coupler 125.

An ignition conductor or wire 181 extends through the rotary valve coupler 125, lying in a passageway running parallel to the longitudinal axis of the rotary valve couper but spaced from all of the other apertures and passageways formed therein. The ignition conductor 181 extends toward the ignition sleeve and is adapted to provide an electrical connection to the igniter 147 housed in the igniter aperture 145. Any suitable coupling means can be used to couple the ignition conductor to the igniter. For example, the igniter 147 may be threaded into the igniter passageway by a suitable insertion wrench passing through an insertion aperture 183 formed in a suitable position in one of the barrel sections 25 (on the opposite side of a combustion chamber for example) such that a suitable connection to the ignition conductor 181 is automatically made. A plug 185 must be provided for closing the insertion aperture 183 subsequent to insertion of the igniter 147, to prevent loss of integrity of the related combustion chamber.

The ignition conductor 181 passing through the rotary valve coupler 125 is either formed contiguous with or connected to a further ignition conductor 187 passing through an aligned longitudinal aperture formed in the ignition sleeve 127. The outer end of the ignition sleeve 127 is beveled into a conical shape. An annular slip ring 189 is housed in an undercut region formed in the beveled end. The other end of the further ignition conductor 187 is connected to the slip ring. Thus, an electrical connection is made from the slip ring 189 to the igniter 147.

Formed in the driveshaft 131 beyond the beveled end of the ignition sleeve 127 is an outer annular roove 191. A radial passageway 193 connects the outer annular groove 191 with the coaxial central aperture 165 formed in the center of the drive shaft 131. The rotary fuel coupler 133 is a cylindrical sleeve mounted about the drive shaft 131 beyond the outer edge of the ignition sleeve 127, such that the drive shaft is rotatable therein. The rotary fuel coupler includes an inner annular groove 195 lying adjacent to the outer annular groove 191 formed in the drive shaft 131. An outwardly extending passageway 197 provides a communication path between the inner annular groove 193 in the rotary fuel coupler 133 and the outer cylindrical surface thereof. Spaced on either side of the inner annular groove 193 are two annular apertures adapted to house ring seals 199.

The rotary ignition coupler 135 is coaxially mounted about, and affixed to, the rotary fuel coupler 133. The rotary ignition coupler includes a longitudinal passageway within which an ignition wire 201 is mounted. The inner end of the rotary ignition coupler 135 is beveled to correspond to the bevel of the outer edge of the ignition sleeve 127. The ignition wire 201 in the passageway in the rotary ignition coupler 135 terminates in a suitable contact adapted to slide on the slip ring 189. Thus, a rotatable electrical connection is provided between the ignition wire 201 and the slip ring 189. That is, an electrical connection is made even though the slip ring is rotated and the rotary ignition coupler remains fixed.

The rotary fuel coupler 133 and the rotary ignition coupler 135 are positioned and formed such that they extend beyond the outer edge of the thrust bearing housing 129. The rotary fuel coupler 133 and rotary ignition coupler 135 are pressed or keyed together so as to be nonrotatable with respect to one another. In addition, they are pressed or keyed into a central aperture 203 formed in the fuel and ignition coupler 33. The diameter of the portion of the rotary ignition coupler 135, extending into the inside of the sine sleeve 121, is slightly smaller than the inner diameter of the sine sleeve. Thus, the sine sleeve is free to rotate about the rotary ignition coupler without applying a rotational force thereto. Similarly, the inner diameter of the rotary fuel coupler 133 is slightly larger than the outer diameter of the drive shaft 131, whereby the drive shaft 131 is free to rotate inside of the rotary fuel coupler 133.

The fuel and ignition coupler 33 is attached to the outer wall of the thrust bearing housing 29 by any suitable means, such as bolts, for example (not shown). The fuel and ignition coupler 33 includes a fuel passageway 204 that communicates with a fuel passageway 205 formed in the rotary ignition coupler 135. The fuel passageway 205 in the rotary ignition coupler communicates with the outwardly extending passageway 197 formed in the rotary fuel coupler 133. Thus, a fuel path is provided between the fuel and ignition coupler 33 and the air/fuel port 151 of the rotary valve coupler 125 via the fuel passageway 203 in the fuel and ignition coupler 33, the fuel passageway 205 in the rotary ignition coupler 135, the outwardly extending passageway 197 in the rotary fuel coupler 133, inner annular groove 195 in the rotary fuel coupler, the outer annular groove 191 in the drive shaft, the radial passageway 193 in the drive shaft 131, the coaxial central aperture 165 in the drive shaft, and the fuel passageway 161 in the rotary valve coupler 125.

The fuel and ignition coupler 33 also includes an ignition aperture 207 through which an ignition conductor 209 passes. The ignition conductor 209 is connected to an external ignition wire 211 at one end, via a connector 212, and at the other end to the ignition wire 201 extending through the rotary ignition coupler 135. Thus, an ignition path is provided between the external ignition wire 211 and the igniter 147 via the ignition conductor 209 passing through the fuel and ignition coupler 33, the ignition wire 201 passing through the rotary ignition coupler 135, and the ignition conductors 187 and 181 passing through the ignition sleeve 127 and the rotary valve coupler 125, respectively.

Coaxially mounted in the outer face of the fuel and ignition coupler 33 is a drive shaft bearing 211. The inner face of the drive shaft bearing is affixed to the drive shaft 131 and the outer face is affixed to a suitable aperture 213 formed in the fuel and ignition coupler 33. A rear seal and bearing retainer ring 215 surrounds the drive shaft 131 beyond the drive shaft bearing 211.

The exhaust and air intake coupler 35 encloses the outer face of the thrust bearing housing 31 mounted at the other end of the engine. The exhaust and air intake coupler includes a rotary seal 221 adapted to rotatably support the outer end of the exhaust tube 123. The outer end of the exhaust tube 123 projects beyond the rotary seal 221 and into a right angle exhaust coupler 223 that extends to a muffler 225 (FIG. 1).

Annularly surrounding the outer periphery of the exhaust and air intake coupler 35, in an annular undercut region 226, is a filter 227. The filter may be formed of any suitable material, such as filter paper. Enclosing the exposed surfaces of the filter 227 is a screen 229. More specifically, the screen 229 is annular in shape and includes a flat face and a ring-shaped face, which allows it to surround the exposed surfaces of the filter 227. One or more passageways 231 angle inwardly from the annular undercut region 226 and terminate in an annular ring-shaped region 233. The annular ring-shaped region surrounds the exhaust tube 123 and communicates with the outside passageway 122, i.e. the passageway lying between the exhaust tube 123 and the sine sleeve 121. In this manner, an air intake path is provided between the exterior of the engine and outside passageway. As described above the outside passageway is in communication with the air/fuel port 151 of the rotary valve coupler 125.

In addition to the foregoing structure, suitable gaskets 235 are mounted between the exhaust and air intake coupler 35 and its related thrust bearing housing 31 and the fuel and ignition coupler 33 and its related thrust bearing housing 29. In addition, sine shaft oil seals 237 lie in annular grooves formed in the exhaust and air intake coupler and the fuel and ignition coupler adjacent the end of the sine sleeve 121.

Turning now to a description of the operation of the four-cycle engine illustrated in the drawings and previously described, FIG. 5 illustrates the six cylinders and twelve pistons in one position during the internal combustion sequence of operation. The upper set of pistons are in an ignition position, i.e., an air/fuel mixture has been drawn into their combustion chamber and compressed. The second set of pistons are in an intermediate position during a power stroke, i.e., the pistons are moving away from one another. The third set of pistons are in an intermediate position during an exhaust stroke, i.e., they are moving toward one another after the power stroke. The fourth set of pistons are at the end of the exhaust stroke, i.e. at the beginning of an intake stroke. The fifth set of pistons are in an intermediate position during an intake stroke. The sixth set of pistons are in an intermediate position during a compression stroke, i.e., they are compressing the air/fuel mixture in the combustion chamber. It will be appreciated that a single double sinusoidal wave encompasses all six of the positions illustrated in FIG. 5. It will further be understood from FIG. 5 that a single double sinusoidal wave encompasses all four cycles of operation. Since the sinusoidal groove pairs 137, contained in the outer surface of the sine sleeve 121 are double it follows that a single revolution of the sine sleeve occurs for each four cycles of operation. Preferably, the angle between adjacent sinusoid apexes is 45°, with respect to an ordinate axis.

It will also be appreciated from viewing FIG. 5 in conjunction with FIG. 3 that the igniter 147 is located at the upper set of pistons, the outlet (exhaust) port 143 is located at the third set of pistons and the inlet (air/fuel) port 141 is located at the fifth set of pistons. It will further be appreciated that, as the pistons reciprocate they cause the sine shaft to rotate, and these ports and the igniter to sequentially move to each combustion chamber.

As will be readily understood by those skilled in the art, a separate starting motor is used to rotate the shaft initially until an air/fuel mixture is drawn into one of the combustion chambers and ignited. Thereafter, continued revolution is provided by the piston drawing in air/fuel mixtures, the air/fuel mixtures being ignited and the pistons being powered away from one another. The longitudinal thrust created by movement of the pistons is compensated for by the thrust bearings 97. The thrust bearings are lubricated via lubrication channels 239 extending angularly outwardly through the related exhaust and air intake coupler or fuel and ignition coupler. The lubricant passes around end nuts 295 adapted to assist in holding the thrust bearings in place in a conventional manner. As noted above, the sine sleeve, 121, exhaust tube 123, rotary valve coupler 125, and ignition sleeve 127 of the sine shaft 39 all rotate. However, the rotary fuel coupler 133 and the rotary ignition coupler 135 do not rotate.

Figure 10:
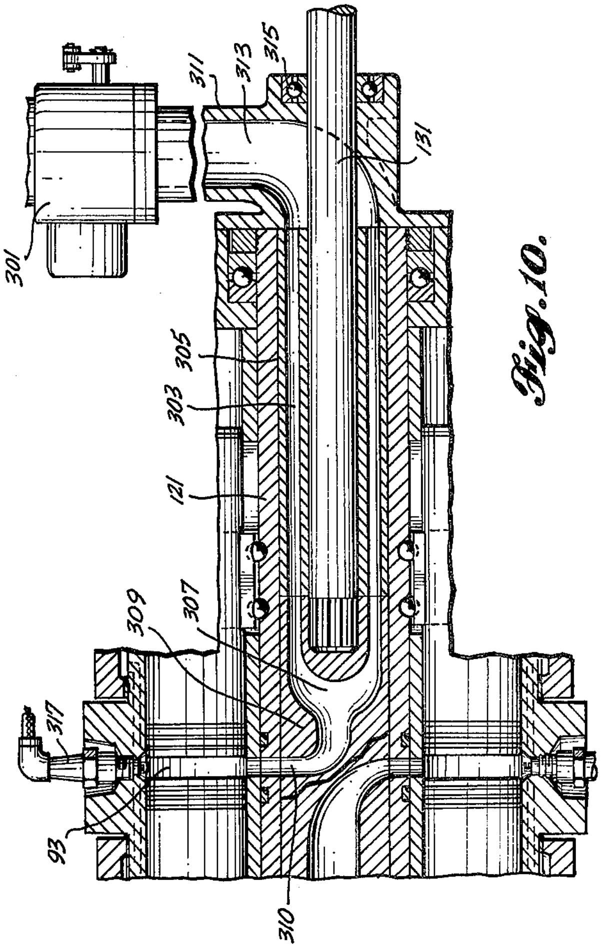
FIG. 10 is a partial, cross-sectional view taken along the longitudinal axis of a multicylinder sinusoidal groove internal combustion engine formed in accordance with the invention illustrating an alternative arrangement for directing an air/fuel mixture through the sine shaft to the piston/cylinder combustion chambers; and, FIG. 11 is a partial cross-sectional view illustrating a fuel injection arrangement for injecting fuel into individual piston/cylinder combustion chambers and a separate igniter for each combustion chamber.

While the embodiment of the invention previously described includes a single igniter and separate flow paths for fuel and air up the air/fuel port 151 of the rotary coupler, obviously, other arrangements can be utilized as desired. FIG. 10 illustrates one such modified arrangement. Specifically, FIG. 10 illustrates an embodiment of the invention wherein air and fuel are mixed in a carburetor 301. The carburetor is connected to an air intake channel 303 lying between the drive shaft 131 and the sine sleeve 121. The air intake channel 303 may be formed by a plurality of longitudinal channels formed in a sleeve 305 mounted between the shaft 131 and the sine sleeve 121. Such a plurality of apertures may terminate at an apertured passageway 308 extending through a rotary valve coupler 309, the apertured passageway terminating in an air/fuel port 310. The carburetor 301 is illustrated as mounted on a carburetor housing 311 through which the drive shaft 131 passes. The carburetor housing 311 includes a right angle passageway 313 connecting the carburetor 301 to the plurality of passageways passing through the sleeve 305. A bearing 315 is provided to support the outer end of the drive shaft 131. In addition, FIG. 10 illustrates a separate igniter (spark plug) 317 for each combustion chamber. The spark plugs 317 are mounted around the periphery of the engine in line with the centers of the combustion chambers 93.

Figure 11:
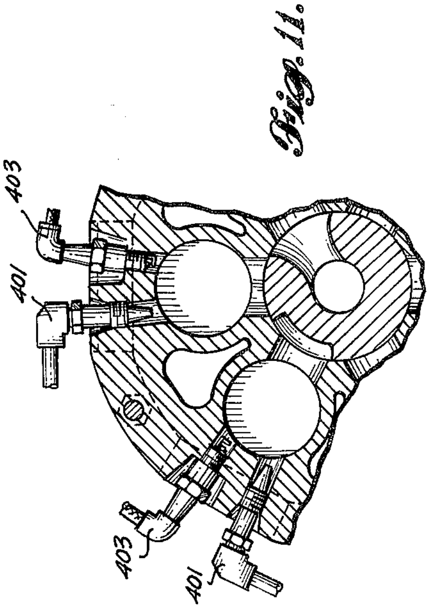

FIG. 11 illustrates a further alternate arrangement wherein air is drawn in either in the manner illustrated in FIG. 2 or in the manner illustrated in FIG. 10 and fuel is injected via fuel injectors 401 mounted about the external periphery of the engine adjacent individual spark plugs 403. Thus, in this arrangement only air and exhaust gases pass through the sine shaft.

While preferred embodiments of the invention have been illustrated and described, various changes can be made therein without departing from the spirit and scope of the invention. For example, air/fuel, ignition wire and other passageways can be formed in different manners, as desired. Moreover, the engine can be operated as a two-cycle, as well as a four-cycle engine if suitable modifications are made, which will be readily apparent to those skilled in the internal combustion engine art. Alternatively, other types of fuel sources (e.g., steam) can be utilized if desired. In this regard, steam under pressure may be inserted via the air/fuel or air passgeway into the combustion chambers, when the rotary valve structure is suitably aligned to cause the pistons to move away from one another in a power stroke, followed by an exhaust stroke. In addition, as noted above, a greater number of cylinders and related pistons pairs can be utilized if desired. Further, in some environments it may be desirable to form the barrel structure in a unitary manner as opposed to being formed of two sections. Moreover, while a preferred angular relationship between adjacent apexes of the sinusoidal groove is 45°, this angle can be changed, if desired. However, such a change will change the torque/stroke relationship such that in one case the engine will be more easily turned over by a starter motor, with a resultant decrease in running output torque, and in the opposite case the output torque will be increased, but a more powerful starter motor will be required. Also, the sinusoidal groove could be replaced by a sinusoidal projection, with suitable changes being made in the coupling mechanism. In other words, different types of sinusoidal tracks can be used if desired. Hence, the invention can be practiced otherwise than as specifically described herein.

The embodiments of the invention in which an exclusive property or privilege is claimed are defined as follows:

1. A multiple cylinder engine comprising:

an engine block comprising first and second sections, each of said sections including a cylindrical central longitudinal aperture and a plurality of radially spaced piston cylinders surrounding said central longitudinal aperture such that the longitudinal axes of said piston cylinders lie parallel to the longitudinal axis of said central longitudinal aperture, each of said sections including a pair of opposed radial slots formed in the wall of each of said piston cylinders, each of said pair of radial slots including an inner slot creating a passageway between its associated piston cyliner and said central longitudinal aperture and an outer slot creating a passageway between its associated cylinder and the exterior of said engine block, said first and second sections affixed together so that said central longitudinal apertures of said sections are aligned with one another along a common longitudinal axis and such that said plurality of piston cylinders are aligned with one another on a one-to-one basis;

a cylindrical sine shaft rotatably mounted in said cylindrical central longitudinal aperture, said sine shaft including at least two sinusoidal grooves formed in its outer periphery, each of said sinusoidal grooves covering two entire sinusoidal waves only, said sinusoidal grooves being 180° out of phase with one another, one of said sinusoidal grooves being aligned with said inner radial slots in said first engine block section and the other sinusoidal groove being aligned with said inner radial slots in said second engine block section;

a plurality of elongate pistons, one of said pistons mounted in each of said plurality of piston cylinders so as to be reciprocable back and forth therein along a reciprocating path of travel, the pistons mounted in aligned piston cylinders and said surrounding area of said piston cylinders forming a chamber suitable for receiving a driving medium adapted to expand in said chambers and cause aligned pistons to move away from one another along said reciprocating path of travel, each of said plurality of pistons including an aperture passing centrally through said piston between the ends thereof and along an axis lying orthogonal to the longitudinal axis of said piston, said piston apertures positioned in said pistons so as to be alignable with the radial slots formed in the wall of the piston cylinder in which each piston is mounted;

a plurality of coupling mechanisms, one coupling mechanism mounted in each of said piston apertures, each of said coupling mechanisms including a pair of blocks suitably slidably mounted in said piston apertures and a spring mounted between said blocks so as to push said blocks away from one another, the length of said blocks being such that the ends of said blocks extend beyond said piston apertures into said radial slots, said block extending through said inner radial slot including a ball bearing race located at its outer end, said plurality of coupling mechanisms further including ball bearings mounted in said ball bearing races in said blocks passing through said inner radial slots and in the sinusoidal groove in the said sine shaft aligned with said inner radial slots, said coupling mechanisms further including retaining means for slidably retaining the outer ends of said blocks extending through said outer radial slots so that said springs produce a force that projects inwardly and presses said ball bearing into said sinusoidal grooves whereby the reciprocating movement of said pistons is transmitted into rotary sine shaft motion; and, conduit means formed in said sine shaft for sequentially directing a driving medium from a source thereof into each of said piston cylinder chambers when said pistons mounted in said piston cylinders are moving through predetermined positions in their related reciprocating path of travel.

2. A multiple cylinder engine as claimed in claim 1 wherein each of said engine block sections includes:

a main barrel part within which said cylindrical central longitudinal aperture and said plurality of equally radially spaced piston cylinders are formed;

a thrust bearing housing mounted on the end of said section remote remote from the ends of said sections affixed together; and, thrust bearings mounted in said thrust bearing housing and supporting the outer ends of said cylindrical sine shaft.

3. A multiple cylinder engine as claimed in claim 2 wherein said thrust bearing housings and said barrel parts of said engine block sections include coolant passageways interspersed between and around said piston cylinders so as to extend through the entire length of said engine block for circulating a coolant entering said engine block via one of said thrust bearing housings and leaving via said other thrust bearing housing.

4. A multiple cylinder engine as claimed in claim 1 wherein:

said sine shaft includes two additional sinusoidal grooves formed in its outer periphery, one located adjacent to and formed parallel with each of said sinusoidal grooves aligned with said radial slots and 180° out of phase with one another, said additional sinusoidal grooves also positioned so as to also be aligned with said inner radial slots in said engine block sections;

said apertures in said pistons and said blocks of said coupling mechanisms are generally rectangular in cross section with the long side of said rectangle lying parallel to the longitudinal axes of said piston cylinders;

the outer ends of said blocks extending through said inner radial slots include a second ball bearing race spaced from said ball bearing race by a distance equal to the separation between the sinusoidal grooves aligned with said inner radial slots; and, said coupling mechanisms also include further ball bearings lying in said second ball bearing races and said additional sinusoidal grooves so that said spring force also presses said further ball bearings into said additional sinusoidal grooves.

5. A multiple cylinder engine as claimed in claim 4 wherein said retaining means of said plurality of coupling mechanisms comprises:

first and second ball bearings races formed in the outer ends of said blocks extending through said outer radial slots;

a pair of ball bearings mounted in said first and second ball bearing races formed in said blocks extending through said outer radial slots; and, slotted covering plates mounted so as to enclose said outer radial slots formed in said engine block sections such that said ball bearings mounted in said first and second ball bearing races formed in said blocks extending through said outer radial slots lie in slots in said slotted covering plates.

6. A multiple cylinder engine as claimed in claim 1 including piston rings located at either ends of said pistons, said piston rings positioned such that said rings do not reach said inner and outer radial slots as said pistons reciprocate back and forth.

7. A multiple cylinder engine as claimed in claim 2 including lubrication passageways passing through said multiple cylinder engine, said lubrication passageways positioned such that lubrication applied to one of said thurst bearings flows around one end of said sine shaft, past said coupling mechanisms and around the other end of said sine shaft to said other thrust bearing via a completely continuous passageway.

8. A multiple cylinder sinusoidal internal combustion engine comprising:

an engine block comprising first and second sections, each of said sections including a cylindrical central longitudinal aperture and a plurality of radially spaced piston cylinders surrounding said central longitudinal aperture such that the longitudinal axes of said piston cylinders lie parallel to the longitudinal axis of said central longitudinal aperture, each of said sections including a pair of radial slots formed in the wall of each of said piston cylinders, each of said pair of opposed radial slots including an inner slot creating a passageway between its associated piston cylinder and said central longitudinal aperture and an outer slot creating a passageway between its associated cylinder and the exterior of said engine block, said first and second sections affixed together so that said central longitudinal apertures of said sections are aligned with one another along a common longitudinal axis and such that said plurality of piston cylinders are aligned with one another on a one-to-one basis;

a cylindrical sine shaft rotatably mounted in said cylindrical central longitudinal aperture, said sine shaft including at least two sinusoidal grooves formed in its outer periphery, each of said sinusoidal grooves covering two entire sinusoidal waves only, said sinusoidal grooves being 180° out of phase with one another, one of said sinusoidal grooves being aligned with said inner radial slots in said first engine block section and the other sinusoidal groove being aligned with said inner radial slots in said second engine block section;

a plurality of elongate pistons, one of said pistons mounted in each of said plurality of piston cylinders so as to reciprocate back and forth therein along a reciprocating path of travel, the pistons mounted in aligned piston cylinders and said surrounding area of said piston cylinders forming a combustion chamber suitable for receiving an ignitable air/fuel mixture medium adapted to expand in said combustion chambers and cause aligned pistons to move away from one another along said reciprocating path of travel, each of said plurality of pistons including an aperture passing centrally through said piston between the ends thereof and along an axis lying orthogonal to the longitudinal axis of said piston, said piston apertures positioned in said pistons so as to be alignable with the radial slots formed in the wall of the piston cylinder in which each piston is mounted;

a plurality of coupling mechanisms, one coupling mechanism mounted in each of said piston apertures, each of said coupling mechanisms including a pair of blocks suitably slidably mounted in said piston apertures and a spring mounted between said blocks so as to push said blocks away from one another, the length of said blocks being such that the ends of said blocks extend beyond said piston apertures into said radial slots, said block extending through said inner radial slot including a ball bearing race located at its outer end, said plurality of coupling mechanisms further including ball bearings mounted in said ball bearing races in said blocks passing through said inner radial slots, said coupling mechanisms further including retaining means for slidably retaining the outer ends of said blocks extending through said outer radial slots so that said springs produce a force that projects inwardly and presses said ball bearing into said sinusoidal groove whereby the reciprocating movement of said pistons is transmitted into rotary sine shaft motion;

conduit means formed in said sine shaft for sequentially directing an air/fuel mixture from a source thereof into each of said combustion chambers when said pistons mounted in said piston cylinders are moving through predetermined positions in their related reciprocating path of travel; and, ignition means mounted adjacent to said combustion chambers for sequentially igniting the air/fuel mixtures in said combustion chambers, said ignition occurring when said pistons are in a predetermined position in their related reciprocating path of travel.

9. A multiple cylinder sinusoidal internal combustion engine as claimed in claim 8 wherein each of said engine block sections includes:

a main barrel part within which said cylindrical central longitudinal aperture and said plurality of equally radially spaced piston cylinders are formed;

a thrust bearing housing mounted on the end of said section remote from the ends of said sections affixed together; and, thrust bearings mounted in said thrust bearing housing and supporting the outer ends of said cylindrical sine shaft.

10. A multiple cylinder sinusoidal internal combustion engine as claimed in claim 9 wherein said thrust bearing housings and said barrel parts of said engine block sections include coolant passageways interspersed between and around said piston cylinders so as to extend through the entire length of said engine block for circulating a coolant entering said engine block via one of said thrust bearing housings and leaving via said other thrust bearing housing.

11. A multiple cylinder sinusoidal internal combustion engine as claimed in claim 8 wherein:

said sine shaft includes two additional sinusoidal grooves formed in its outer periphery, one located adjacent to and formed parallel with each of said sinusoidal grooves aligned with said radial slots and 180° out of phase with one another, said additional sinusoidal grooves also positioned so as to also be aligned with said inner radial slots in said engine block sections;

said apertures in said pistons and said blocks of said coupling mechanisms are generally rectangular in cross section with the long side of said rectangle lying parallel to the longitudinal axes of said piston cylinders;

the outer ends of said blocks extending through said inner radial slots include a second ball bearing race spaced from said ball bearing race by a distance equal to the separation between the sinusoidal grooves aligned with said inner radial slots; and, said coupling mechanisms also include further ball bearings lying in said second ball bearing races and said additional sinusoidal grooves so that said spring force also presses said further ball bearings into said additional sinusoidal grooves.

12. A multiple cylinder sinusoidal internal combustion engine as claimed in claim 11 wherein said retaining means of said plurality of coupling mechanisms comprises:

first and second ball bearings races formed in the outer ends of said blocks extending through said outer radial slots;

a pair of ball bearings mounted in said first and second ball bearing races formed in said blocks extending through said outer radial slots; and, slotted covering plates mounted so as to enclose said outer radial slots formed in said engine block sections such that said ball bearings mounted in said first and second ball bearing races formed in said blocks extending through said outer radial slots lie in slots in said slotted covering plates.

13. A multiple cylinder sinusoidal internal combustion engine as claimed in claim 8 including piston rings located at either ends of aid pistons, said piston rings positioned such that said rings do not reach said inner and outer radial slots as said pistons reciprocate back and forth.

14. A multiple cylinder sinusoidal internal combustion engine as claimed in claim 9 including lubrication passageways passing through said multiple cylinder engine, said lubrication passageways positioned such that lubrication applied to one of said thrust bearings flows around one end of said sine shaft, past said coupling mechanisms and around the other end of said sine shaft to said other thrust bearing via a completely continuous passageway.

15. A multiple cylinder sinusoidal internal combustion engine as claimed in claim 8, wherein said sine shaft includes an exhaust passageway and a rotary valve, said rotary valve including an exhaust port connected to said exhaust passageway, said rotary valve formed such that, as said sine shaft is rotated, said exhaust port is sequentially aligned with said combustion chambers such that exhaust gasses formed by the ignition of said air/fuel mixture are directed to said exhaust passageway, said exhaust passageway extending parallel to the longitudinal axis of said sine shaft so as to direct exhaust gasses out one end of said sine shaft.

16. A multiple cylinder sinusoidal internal combustion engine as claimed in claim 15, wherein said sine shaft also includes an inlet passageway for receiving air and fuel and said rotary valve also includes an inlet port, said rotary valve formed such that, as said sine shaft is rotated, said inlet port is sequentially aligned with said combustion chambers such that any air/fuel mixture in said inlet passageway is sequentially directed to said combustion chambers.

17. A multiple cylinder sinusoidal internal combustion engine as claimed in claim 16, wherein said plurality of piston cylinders equals six piston cylinders located along equally spaced radii extending outwardly from the longitudinal axis of said central longitudinal aperture of said engine block when viewed in a plane orthogonal thereto and wherein the arcuate distance between the nominal centers of said intake exhaust ports is 120°.

18. A multiple cylinder sinusoidal internal combustion engine as claimed in claim 17, including an igniter mounted in said sine shaft so as to be orthogonally aligned with, but radially spaced from, the nominal centers of said intake and exhaust ports.

19. A multiple cylinder sinusoidal internal combustion engine as claimed in claim 8, wherein said sine shaft includes:

a hollow cylindrical sine sleeve, said two spaced sinusoidal grooves being formed in said sine sleeve, said sine sleeve including intake and exhaust ports, said intake and exhaust ports being located between said two spaced sine grooves along the longitudinal length of said sine sleeve;

a rotary valve coupler, said rotary valve coupler cylindrical and mounted in said sine sleeve, said rotary valve coupler including an inlet passageway for coupling and intake passageway to said intake port and an outlet passageway for coupling an exhaust passageway to said exhaust port; and, a hollow exhaust tube coaxillay mounted in said rotary valve coupler and sized such that said intake passageway is formed between the inner wall of said sine sleeve and the outer wall of said exhaust tube, and said exhaust passageway is formed by the central aperture in said hollow exhaust tube.

20. A multiple cylinder sinusoidal internal combustion engine as claimed in claim 19, wherein said plurality of piston cylinders equals six piston cylinders located along equally spaced radii extending outwardly from the longitudinal axis of said central longitudinal aperture of said engine block when viewed in a plane orthogonal thereto and wherein the arcuate distance between the nominal centers of said intake and exhaust ports is 120°.

21. A multiple cylinder sinusoidal internal combustion engine as claimed in claim 20, including an igniter mounted in said sine shaft so as to be orthogonally aligned with, but radially equally spaced from the nominal centers of said intake and exhaust ports.

22. A multiple cylinder sinusoidal internal combustion engine as claimed in claim 21, wherein said sine shaft also includes electric coupling means for electrically coupling a source of electric energy to said igniter and fuel conduit means for conducting fuel from a fuel source to said inlet port.

23. A multiple cylinder sinusoidal internal combustion engine as claimed in claim 22, wherein said electric coupling means comprises a rotary power coupler located between said sine shaft and said engine block and an electric conduit connecting said rotary power coupler to said igniter.

24. A multiple cylinder sinusoidal internal combustion engine as claimed in claim 23, wherein said fuel conduit means comprises a fuel passageway formed in said sine shaft and having a terminating end located at said inlet port, and a fuel coupler located between said sine shaft and said engine block for transfering fuel to the other end of said longitudinal aperture.

25. A multiple cylinder sinusoidal internal combustion engine as claimed in claim 24, wherein said sine sleeve includes a drive shaft coaxially mounted in said rotary valve coupler, said fuel passageway being formed in said drive shaft; and, wherein said fuel coupler comprises a rotary fuel coupler surrounding said drive shaft, said drive shaft including an outer circumferential groove, said rotary valve coupler including an inner circumferential groove axially aligned with the outer groove formed in said drive shaft.

26. In a multiple cylinder engine including an engine block having a cylindrical central longitudinal aperture and a plurality of radially spaced piston cylinders surrounding said central longitudinal aperture such that the longitudinal axes of said piston cylinders lie parallel to the longitudinal axis of said central longitudinal aperture, a cylindrical shaft having a sinusoidal groove formed in its outer periphery and a plurality of pistons mounted in said piston cylinders so as to be reciprocatable back and forth therein along a reciprocating path of travel upon the receipt of a driving medium in chambers defined by said piston cylinders and said pistons an improved coupling system comprising:

a pair of opposed radial slots formed in the walls of each of said piston cylinders along a radius extending outwardly from the central longitudinal axis of said central longitudinal aperture, said radial slots including an inner radial slot forming a passageway between its associated piston cylinder and said central longitudinal aperture and an outer radial slot;

an aperture passing through each of said pistons between the ends thereof and lying along an axis orthogonal to the longitudinal axes of said pistons, said piston apertures positioned in said pistons so as to be alignable with the radial slots formed in the piston cylinders within which a particular piston is mounted; and, a plurality of coupling mechanisms, one coupling mechanism mounted in each of said piston apertures, each of said coupling mechanisms including a pair of blocks slidably mounted in said piston apertures and a spring mounted between said blocks so as to push said blocks away from one another, the length of said blocks being such that the ends of said blocks extend beyond said piston apertures into radial slots when said piston apertures are aligned with said radial slots, said blocks extending through said inner radial slots including a ball bearing race formed in their outer ends, said plurality of coupling mechanisms further including ball bearings mounted in said ball bearing races in said blocks passing through said inner radial slots and in the sinusoidal groove in said cylindrical shaft aligned, said coupling mechanism further including retaining means for slidably retaining the outer ends of said blocks extending through said outer radial slots so that said springs produce a force that projects inwardly and presses said ball bearings into said sinusoidal groove whereby reciprocating movement of said pistons is transmitted into rotary shaft motion.

27. The improvement claimed in claim 26 wherein:

said sine shaft includes a pair of parallel sinusoidal grooves;

said apertures in said pistons and said blocks of said coupling mechanisms are generally rectangular in cross section with the long side of said rectangle lying parallel to the longitudinal axes of said piston cylinders;

the outer ends of said blocks extending through said inner slots include a second ball bearing race spaced from said ball bearing race by a distance equal to the separation between said parallel sinusoidal grooves and, said coupling mechanism also include further ball bearings lying said second ball bearing race and a sinusoidal groove lying adjacent to said second ball bearing race.

28. The improvement claimed in claim 27 wherein said retaining means of said plurality of coupling mechanisms comprises:

first and second ball bearing races formed in the outer ends of said block extending through said outer radial slots;

a pair of ball bearings mounted in said first and second ball bearing races formed in said blocks extending through said outer radial slots; and, a slotted covering plate mounted so as to enclose said outer radial slots formed in said engine block section such that said ball bearings mounted in said races formed in said outer radial slots lie in slots in said slotted covering plates.

* * * * *

UNITED STATES PATENT AND TRADEMARK OFFICE

CERTIFICATE OF CORRECTION

PATENT NO. : 4,090,478

DATED : May 23, 1978

INVENTOR(S) : Trimble et al.

It is certified that error appears in the above-identified patent and that said Letters Patent are hereby corrected as shown below:

Col. 1, line 21, delete "in" (second occurrence) and insert —is—;
line 24, delete "commbustion" and insert —combustion—.
Col. 2, lines 45 and 46, delete "cylid-ners" and insert —cylind-er—.
Col. 4, line 5, delete "an" and insert —can—.
Col. 5, lines 12, 13, 25, 27, 35 and 37, delete "principle" and insert —principal—.
Col. 6, lines 45 and 46, delete "princi-ple" and insert —princi-pal—;
line 46, delete "longitudnal" and insert —longitudinal—.
Col. 7, line 45, delete "housing" and insert —housings—.
Col. 8, line 25, delete "ignitor" and insert —igniter—.
Col. 9, line 24, delete "since" and insert —sine—;
line 64, delete "couper" and insert —coupler—.
Col. 10, line 24, delete "roove" and insert —groove—.
Col. 13, line 3, after "up", insert —to—.
Col. 14, line 18, delete "cyliner" and insert —cylinder—.
Col. 15, line 24, delete "remote" (second occurrence);
line 66, delete "bearings" and insert —bearing—.
Col. 16, line 58, delete "reciprocate" and insert —be reciprocable—.
Col. 18, line 23, delete "bearings" and insert —bearing—;
line 37, delete "aid" and insert —said—.
Col. 19, line 27, before "cylindrical" insert —being—.
Col. 20, line 1, delete "transfering" and insert —transferring—.

Signed and Sealed this

*Twenty-third* Day of *January 1979*

[SEAL]

*Attest:*

RUTH C. MASON
*Attesting Officer*

DONALD W. BANNER
*Commissioner of Patents and Trademarks*